Patented Sept. 12, 1933

1,926,631

UNITED STATES PATENT OFFICE 1,926,631

WOOL DYE OF THE TRIPHENYLMETHANE SERIES

Ernest Harry Rodd, Timperley, and Frederick Lawrence Sharp, Huddersfield, England, assignors to Imperial Chemical Industries Limited, Westminster, England No Drawing. Application August 6, 1930, Serial No. 473,509, and in Great Britain August 19, 1929

4 Claims. (Cl. 260—67)

This invention relates to a new product and the process of its manufacture. More particularly it relates to dyestuffs prepared from 2-amino-1:3-dimethyl-benzene and diaralkyl-dialkyl-amino - diphenyl - benzhydrol disulphonic acids.

It is known to prepare acid wool dyes from dibenzyl - dialkyldiaminodiphenylmethanedisulphonic acids of the formula:

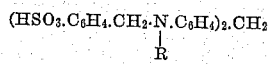

wherein R represents an alkyl group, by oxidizing the methane hydrogen to hydroxyl, condensing the resulting carbinol with a suitable aromatic amine to form a triaminotriphenyl-methane derivative, and oxidizing the latter to the dye. As aromatic amines only tertiary amines such as dialkylanilines, or secondary amines having a substituent in the ortho position, such as monoalkyl-o-toluidines, have hitherto been found suitable in practice; and it is well known to those skilled in the art that primary amines such as aniline and o-toluidine are entirely unsuitable, the yield of dyestuff obtained in these cases being so meagre that to make them on a manufacturing scale is out of the question. It is indeed generally known that such leuco compounds of the triarylmethane series as contain primary amino groups cannot be satisfactorily oxidized to the corresponding triarylmethane dyestuff.

The present invention is based on the discovery that m-2-xylidine (2-amino-1:3-dimethylbenzene) condenser with diaralkyldialkyldiaminobenzhydrol disulphonic acids to give leuco compounds which are smoothly and satisfactorily oxidized to triphenylmethane dyestuffs. This behavior of m-2-xylidine, contrary to that of its congeners, could not be foreseen.

The process of manufacture in accordance with our invention consists preferably in an oxidative condensation, wherein we take as starting out materials m-2-xylidine on the one hand and diaralkyldialkyldiaminomethane disulphonic acids on the other, and conduct the oxidation to the so-called hydrol, condensation of the leuco compound, and oxidation of the latter as one operation, but we do not limit ourselves to this particular embodiment of our invention, it being obvious that the reaction may be carried out in other ways.

The reaction may be represented in general terms by the following equations:

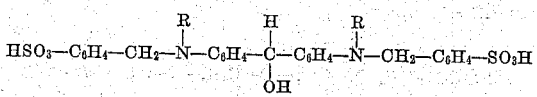

is condensed with 2-amino-1.3-dimethyl benzene

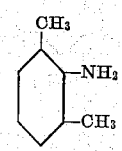

to form a leuco compound having the formula

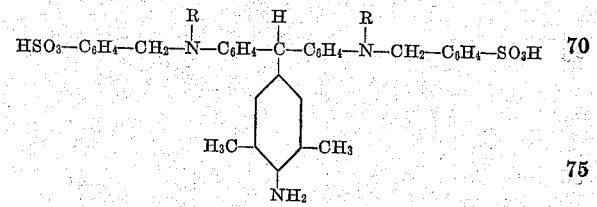

In the above formula R represents an alkyl group and any aralkyl group may be used instead of the benzyl group.

Our invention is illustrated, but not limited by the following example, in which the parts are by weight.

Example

A solution is made of 59.4 parts dibenzyldiethyldiaminodiphenylmethanedisulphonic acid in 2500 parts of water and, at 40° C., a solution of 20 parts of sodium dichromate in 100 parts water is added, and at the same time 12.1 parts of m-2-xylidine. The solution is stirred at this temperature for 12 hours, during which time the violet color develops, and the reaction is completed by heating for a short period at 80° C. The precipitated chromium residue is filtered off and the dyestuff separated by the addition of common salt of the filtrate. The dyestuff forms a tarry mass which, after drying, can be ground to powder. It is readily soluble in water to a reddish-violet solution.

The dye in the form of the free acid has the following formula:

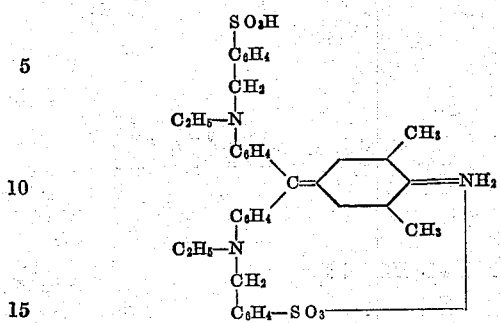

The dyestuffs we obtain in accordance with our invention dye wool in reddish violet shades of exceptional interest. The dyeings are of very good fastness to washing and milling. The dyestuffs are also suitable for dyeing union materials.

As many apparently widely different embodiments of this invention may be made without departing from the spirit thereof, it is to be understood that we do not limit ourselves to the foregoing examples or descriptions except as indicated in the following patent claims.

We claim:

1. A dyestuff having the following general formula:

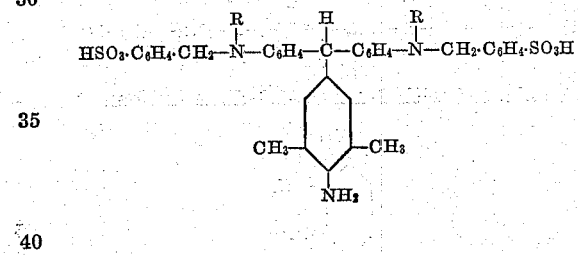

wherein R represents an alkyl group and the benzyl group may be replaced by any aralkyl group.

2. A dyestuff having the following general formula:

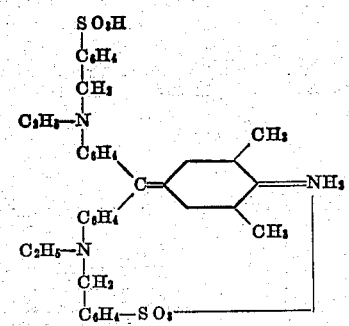

3. The process of preparing a dyestuff of the triphenyl methane series which comprises condensing a diaralkyl-dialkyl-diamino-diphenyl-benzhydrol disulphonic acid with 2-amino-1:3-dimethyl benzene and oxidizing the resulting leuco compounds.

4. The process of preparing a dyestuff of the triphenyl methane series which comprises condensing dibenzyl-diethyl-diamino-diphenylmethane disulphonic acid with 2-amino-1:3-dimethyl benzene and oxidizing the resulting leuco compound.

ERNEST HARRY RODD.
FREDERICK LAWRENCE SHARP.